US007809680B2

(12) United States Patent
Fujioka

(10) Patent No.: US 7,809,680 B2
(45) Date of Patent: Oct. 5, 2010

(54) CONTENTS DISTRIBUTION SYSTEM WITH INTEGRATED RECORDING RIGHTS CONTROL

(75) Inventor: Naotaka Fujioka, Hiroshima (JP)

(73) Assignee: Panasonic Corporation, Osaka (JP)

( * ) Notice: Subject to any disclaimer, the term of this patent is extended or adjusted under 35 U.S.C. 154(b) by 138 days.

(21) Appl. No.: 10/512,385

(22) PCT Filed: Mar. 26, 2004

(86) PCT No.: PCT/JP2004/004328

§ 371 (c)(1),
(2), (4) Date: Oct. 25, 2004

(87) PCT Pub. No.: WO2004/086724

PCT Pub. Date: Oct. 7, 2004

(65) Prior Publication Data

US 2005/0240548 A1    Oct. 27, 2005

(30) Foreign Application Priority Data

Mar. 27, 2003    (JP)    ............... 2003-088485

(51) Int. Cl.
G06F 7/00    (2006.01)
G06F 17/00    (2006.01)
(52) U.S. Cl. ............... 707/609; 707/705; 707/913; 725/86
(58) Field of Classification Search ............ 380/28; 709/227, 231, 207, 226, 232; 713/170, 185; 707/104.1, 10, 609, 705, 821, 913; 715/720; 714/748; 370/538, 419; 725/32, 90, 86; 345/619; 705/51
See application file for complete search history.

(56) References Cited

U.S. PATENT DOCUMENTS

| 6,061,449 | A  | * | 5/2000  | Candelore et al. ........... 380/28 |
| 6,385,596 | B1 | * | 5/2002  | Wiser et al. ................. 705/51 |
| 6,460,082 | B1 | * | 10/2002 | Lumelsky et al. ........... 709/226 |
| 6,480,489 | B1 | * | 11/2002 | Muller et al. ................ 370/389 |
| 6,640,244 | B1 | * | 10/2003 | Bowman-Amuah ......... 709/207 |
| 6,711,709 | B1 | * | 3/2004  | York .......................... 714/748 |
| 7,191,023 | B2 | * | 3/2007  | Williams .................... 700/94 |
| 7,447,242 | B2 | * | 11/2008 | Geagan et al. .............. 370/538 |
| 2001/0030660 | A1 | * | 10/2001 | Zainoulline ................ 345/720 |

(Continued)

FOREIGN PATENT DOCUMENTS

JP    2000-041211    2/2000

(Continued)

Primary Examiner—John E Breene
Assistant Examiner—Giovanna Colan
(74) Attorney, Agent, or Firm—Wenderoth, Lind & Ponack, L.L.P.

(57) ABSTRACT

A content distribution system that includes a distributing apparatus that stores content which is distributable to a recipient apparatus. At least some of the content which is designated by the recipient apparatus is distributed by a streaming technique. During distribution of the content by the streaming technique, in response to a saving request from the recipient apparatus, the distributing apparatus generates and transmits a saving permission signal for notifying the recipient apparatus that saving of the content is permitted. As a result, the received content is saved in the recipient apparatus. After the distribution of the content by the streaming technique is completed, the distributing apparatus distributes difference data, which is a portion of the content that has not been saved in the recipient apparatus, by downloading technique.

5 Claims, 9 Drawing Sheets

U.S. PATENT DOCUMENTS

| | | | |
|---|---|---|---|
| 2002/0174442 A1* | 11/2002 | Nomura | 725/115 |
| 2002/0178360 A1* | 11/2002 | Wenocur et al. | 713/170 |
| 2002/0188747 A1* | 12/2002 | Takeuchi et al. | 709/232 |
| 2002/0194483 A1* | 12/2002 | Wenocur et al. | 713/185 |
| 2003/0200548 A1* | 10/2003 | Baran et al. | 725/90 |
| 2003/0206553 A1* | 11/2003 | Surcouf et al. | 370/419 |
| 2004/0010595 A1* | 1/2004 | Hiranaka | 709/227 |
| 2004/0088328 A1* | 5/2004 | Cook et al. | 707/104.1 |
| 2005/0034152 A1* | 2/2005 | Matsumoto et al. | 725/32 |
| 2006/0256130 A1* | 11/2006 | Gonzalez | 345/619 |

FOREIGN PATENT DOCUMENTS

| | | |
|---|---|---|
| JP | 2001-036846 | 2/2001 |
| JP | 2002-094551 | 3/2002 |
| WO | 01/98903 | 12/2001 |
| WO | 03/007213 | 1/2003 |

* cited by examiner

CONTENTS DISTRIBUTION SYSTEM WITH INTEGRATED RECORDING RIGHTS CONTROL

FIELD OF THE INVENTION

The present invention relates generally to a content distribution system, and more particularly to a content distribution system in which a content distributing apparatus distributes media content to a content recipient apparatus.

BACKGROUND OF THE INVENTION

In recent years, it has become more and more popular to distribute media content (hereinafter, simply referred to as "content") over digital networks. As defined herein, "content" has characteristics such that it varies over time from its beginning to end, as in an audio or video (moving picture) content. As such, content has a large data size relative to that of a still image or text. Typically, content is transmitted over a digital network from a device which is on the distributing end of the content (hereinafter a "distributing apparatus") to a device which is on the receiving end of the content (hereinafter a "recipient apparatus") by using either a streaming technique or a downloading technique, depending on the purpose for which the content is used (as described later).

Streaming is a technique in which a recipient apparatus that is acquiring the content from a distributing apparatus over a digital network is allowed to reproduce the acquired content during the acquisition. In other words, streaming is mainly directed to on-line reproduction of contents by the recipient apparatus. More specifically, the distributing apparatus splits the content into a number of data blocks, and sequentially delivers the generated data blocks to the recipient apparatus. In the recipient apparatus, each received data block is buffered to memory, and thereafter reproduced. Each data block which has been reproduced is discarded. The recipient apparatus may include in its interior a non-volatile storage device such as a hard disk drive, but the data blocks are not meant to be stored in such a non-volatile storage device under most streaming techniques. Thus, under most streaming techniques, copies of content are not generated on the internal storage device of the recipient apparatus. As such, streaming techniques are likely to be employed for the distribution of content which have a relatively short reproduction time and/or a relatively low quality, e.g., music samples, video digests, or movie previews.

On the other hand, downloading is a technique in which the recipient apparatus first acquires the entire content from the distributing apparatus, saves the content, and thereafter reproduces the saved content. In other words, downloading is mainly directed to off-line reproduction of content by the recipient apparatus. More specifically, the recipient apparatus saves the content which has been obtained from the distributing apparatus to a non-volatile storage device in the recipient apparatus. Thereafter, in response to a user's instructions, the recipient apparatus reproduces the saved content. Thus, in a downloading technique, a copy of the content is generated within the recipient apparatus, unlike in a streaming technique. As such, downloading techniques are likely to be employed for the distribution of content which has a relatively long reproduction time and/or a relatively high quality, e.g., complete pieces of music or video, or actual movies themselves.

As described above, streaming and downloading have different characteristics. There is conventional content distribution systems which utilize such different characteristics of the two types of techniques in such a manner that the distribution of content is performed while switching between streaming and downloading, depending on the content is being transmitted. In such a conventional content distribution system, streaming is initially employed, immediately after a content distribution is begun. During streaming, the recipient apparatus will begin reproducing a content every time a certain number of data blocks therefrom have been accumulated and therefore the user can begin to enjoy the content after a relatively short wait time. On the other hand, if the transmission error rate increases after the content distribution has begun, the distributing apparatus switches its operation from streaming to downloading. Since a downloading technique is of such a nature that it allows for an easier error correction than a streaming technique, the aforementioned switching from streaming to downloading can prevent degradation in the content quality. Also, if the transmission band width becomes scarce during downloading, those contents which can suitably be distributed through multi-casting will be distributed through multi-casting by switching to streaming.

During a content distribution in general, a user who has acquired a content by means of his or her recipient apparatus and is currently enjoying the acquired content on the recipient apparatus may wish to save the currently-reproduced content, in its entirety, in the recipient apparatus. However, since a conventional contents distribution system employs streaming immediately after beginning a content distribution, those portions of the content which have already been reproduced are discarded. Therefore, even if the user decides to save the entire content in the recipient apparatus in the aforementioned situation, the distributing apparatus will need to redeliver the entire desired content through downloading, from beginning to end; and the recipient apparatus will then save in an internal non-volatile storage device the whole content thus delivered. Thus, in accordance with a conventional contents distribution system, at least the beginning portion of a content needs to be delivered twice, thereby hindering efficient content distribution.

The aforementioned problem will be more specifically described. Generally speaking, a user who is thinking of purchasing a piece of music as content may wish to try a sample of the music prior to making the purchase. Similarly, a user who is thinking of purchasing a complete body of video or an actual movie as content may wish to try a previously-prepared sample version of the video prior to the purchase (e.g., a video digest or a movie preview). In order to enjoy such a partial content, the user issues an instruction in accordance with a the recipient apparatus that requests the distributing apparatus to distribute the partial content. Thereafter, the recipient apparatus reproduces the partial content sent from the distributing apparatus in the streaming mode. After reproduction is over, the partial content is discarded by the recipient apparatus.

After the partial content has been enjoyed, depending on the user's decision, the recipient apparatus may request the distributing apparatus for the complete, entire content (e.g., the whole music or video). In conventional content distribution systems, in response to a request from the recipient apparatus, the distributing apparatus delivers the complete music or video as content to the recipient apparatus; while switching between streaming and downloading as appropriate.

It is often the case that a complete piece of music (or video) and a music (or video) sample therefor contain the same substance. However, conventional content distribution systems work in such a manner that, after the user has enjoyed partial content (e.g., a music sample, a video digest, or a movie preview), the recipient apparatus receives the complete content in its entirety. Thus, it takes a substantial amount of time for the recipient apparatus to save the complete content. Furthermore, the user cannot enjoy the complete content until the downloading process is completed at the recipient apparatus. In this respect, the conventional content distribution systems are not performing an efficient content distribution on behalf of the user.

In recent years, as another type of recipient apparatus, recording apparatuses (i.e., apparatuses that internalize any of a variety of recording media, e.g., a HD (Hard Disc), a DVD (Digital Versatile Disc) or a Blu-Ray® disc) have been made into products. Such a recording apparatus is connected to a display device, e.g., a television set, in most cases. A user who has been viewing a content (e.g., a video program) which is displayed on the display device up to a certain point may wish to save the content to the recording apparatus. However, as described above, the conventional content distribution systems discard those portions of the content which have already been reproduced. Therefore, a user wishing to save the entire content to the recording apparatus in the aforementioned situation will need to wait for a rerun of the same program in future. This case is another example which illustrates the need to deliver the same content twice.

Thus, an object of the present invention is to provide a contents distribution system which makes possible an efficient content distribution.

SUMMARY OF THE INVENTION

To achieve the above object, a first aspect of the present invention is directed to a content distribution system for distributing content from a distributing apparatus to a recipient apparatus. The distributing apparatus comprises a content storage section, a content reading section, and a first distribution section. The content storage section is operable to store content which is distributable to the recipient apparatus, and the content reading section is operable to read a content from the content storage section. The first distribution section is operable to distribute the content read by the content reading section. The recipient apparatus comprises a first storage section, a reproduction section, and a saving request generation section. The first storage section is operable to temporarily store the content distributed from the first distribution section, and the reproduction section is operable to reproduce the content temporarily stored to the first storage section. The saving request generation section is operable to generate a saving request for permission to save the content which is currently reproduced by the reproduction section. Additionally, the distributing apparatus further comprises a saving request determination section, a difference data reading section, and a second distribution section. The saving request determination section is operable to determine, in response to the saving request generated by the saving request generation section, whether or not to give a saving permission for the recipient apparatus to save the content which is currently distributed by the first distribution section; a difference data reading section operable to read difference data if the saving request determination section has determined to give the saving permission and if the content reading section has completed reading the content. The difference data is a portion of the content, whose reading has currently been completed, which portion was distributed before the saving request determination section determines to give the saving permission. And, the second distribution section operable to distribute the difference data read by the difference data reading section. The recipient apparatus further comprises a non-volatile second storage section operable to, within the currently reproduced content, save a portion which is distributed from the distributing apparatus after the saving request is generated. The difference data which is distributed from the second distribution section after the reproduction of the content is completed is also saved.

A second aspect of the present invention is directed to a distributing apparatus for distributing content to a recipient apparatus. The distributing apparatus comprises a content storage section, a first distribution section, a saving request determination section, a difference data reading section, and a second distribution section. The content storage section is operable to store content which is distributable to the recipient apparatus, and the content reading section is operable to read content from the content storage section. The first distribution section operable to distribute the content read by the content reading section, and the saving request determination section is operable to determine, in response to a saving request from the recipient apparatus, whether or not to give a saving permission for the recipient apparatus to save the content which is currently distributed by the first distribution section. The a difference data reading section is operable to read difference data if the saving request determination section has determined to give the saving permission and if the content reading section has completed reading the content. The difference data is a portion of the content, whose reading has currently been completed, which portion was distributed before the saving request determination section determines to give the saving permission. The second distribution section is operable to distribute the difference data read by the difference data reading section.

In one example, the first distribution section distributes the content by a streaming technique, and the second distribution section distributes the difference data by a downloading technique.

In one example, the first distribution section may be operable to (until the saving request determination section determines to give the saving permission) distribute the content read by the content reading section in a format which does not allow saving to the recipient apparatus. And, after the saving request determination section has determined to give the saving permission, distribute the content read by the content reading section in a format which allows saving to the recipient apparatus.

The recipient apparatus may be operable to transmit a download request for downloading the content for which the saving permission has been given, and the difference data reading section may be operable to read the difference data in response to the download request from the recipient apparatus.

The first distribution section may be operable to generate a plurality of data blocks for distribution by splitting the content read by the content reading section according to a streaming technique. The distributing apparatus may further comprise a data resending section operable to resend any data block which was transmitted by the first distribution section but was not received by the recipient apparatus.

In one example, the content distributed by the first distribution section and the difference data distributed by the second distribution section may be of different qualities.

The content may be distributed to the recipient apparatus via a digital network, and the difference data reading section may be operable to read the difference data if the saving request determination section has determined to give the saving permission, and if the digital network has a sufficient transmission band width.

A third aspect of the present invention is directed to a recipient apparatus for acquiring a content from a distributing apparatus. The recipient apparatus comprises a first storage section, a reproduction section, a saving request generation section, and a non-volatile section storage section. The first storage section is operable to temporarily store the content distributed from the distribution apparatus, and the reproduction section is operable to reproduce the content temporarily stored to the first storage section. The saving request generation section is operable to generate a saving request for permission to save the content which is currently reproduced by the reproduction section, and the non-volatile second storage section is operable to save first saving data. The first saving data is a portion of the content currently reproduced by the reproduction section that is distributed from the distributing apparatus after the saving request is generated. The second storage section is further operable to save second saving data, the second saving data being a remainder of the content which is transferred from the distributing apparatus or the first storage section, such that the first saving data and the second saving data include the entire content.

In one example, the first storage section may comprise a volatile memory and is operable to buffer the content distributed from the distributing apparatus by streaming technique. The second storage section may be operable to save, as the first saving data, a partial content which is distributed from the distributing apparatus by streaming technique after the saving request is generated. The second storage section may also be operable to save, as the second saving data, a partial content which is distributed from the distributing apparatus by downloading technique after the distribution by streaming technique is completed.

In one example, the recipient apparatus may further comprise an update section operable to update management information used for the first and second saving data saved to the second storage section.

In an embodiment of the invention, the first storage section may include a rewritable storage medium for temporarily storing the content distributed from the distributing apparatus, and the second storage section may be operable to save, as the first saving data, a partial content which is distributed from the distributing apparatus after the saving request is generated. The second storage section may also be operable to save as the second saving data a partial content in the first storage section after the reproduction of the content is completed.

In an embodiment of the invention, the first storage section may include a rewritable storage medium for temporarily storing the content distributed from the distributing apparatus, and the second storage section may be operable to save as the first saving data a partial content which is distributed from the distributing apparatus after the saving request is generated. The recipient apparatus may further comprise a resend request generation section operable to, after the reproduction of the content is completed, generate a resend request for the distributing apparatus to resend any unsaved portion of the content whose reproduction is completed. The second storage section may be further operable to save as the second saving data a partial content which is sent from the distributing apparatus after the resend request is generated. The second storage section may include a removable distributable medium for storing the first and second saving data.

A fourth aspect of the present invention is directed to a distributing method for distributing content to a recipient apparatus. The distributing method comprises a content reading step, a first distribution step, a saving request determination step, a difference data reading step, and a second distribution step. The content reading step reads from a storage device content which is distributable to the recipient apparatus, and the first distribution step distributes the content read in the content reading step. The saving request determination step determines, in response to a saving request from the recipient apparatus, whether or not to give a saving permission for the recipient apparatus to save the content, which is currently distributed by the first distribution step. The difference data reading step reads difference data if the saving request determination step has determined to give the saving permission, and if the content reading step has completed reading the content. The difference data is a portion of the content, whose reading has currently been completed, and which portion has not been saved by the recipient apparatus. The second distribution step distributes the difference data read in the difference data reading step.

A fifth aspect of the present invention is directed to an acquisition method for acquiring a content from a distributing apparatus. The acquisition method comprises a first storage step, a reproduction step, and a second storage step. The first storage step temporarily stores to a first storage device the content distributed from the distribution apparatus, and the reproduction step of reproducing the content temporarily stored in the first storage step. The saving request generation step generates a saving request for permission to save the content which is currently reproduced by the reproduction step. The second storage step, within the content currently reproduced by the reproduction step, saves to a non-volatile second storage device a portion which is distributed from the distributing apparatus after the saving request is generated. After the reproduction of the content in the reproduction step is completed, the second storage step further comprises saving any unsaved portion of the content which is transferred from the distributing apparatus or the first storage device.

A sixth aspect of the present invention is directed to a computer program for enabling a distributing apparatus to distribute a content to a recipient apparatus. The computer program performs steps comprising a content reading step, a first distribution step, a saving request determination step, a difference data reading step, and a second distribution step. The content reading step reads from a storage device a content which is distributable to the recipient apparatus, and the first distribution step distributes the content read in the content reading step. The saving request determination step determines, in response to a saving request from the recipient apparatus, whether or not to give a saving permission for the recipient apparatus to save the content which is currently distributed by the first distribution step. The difference data reading step reads difference data if the saving request determination step has determined to give the saving permission. The difference data reading step also reads difference data if the content reading step has completed reading the content, wherein the difference data is a portion of the content, whose reading has currently been completed, which portion has not been saved by the recipient apparatus. The second distribution step distributes the difference data read in the difference data reading step.

A seventh aspect of the present invention is directed to a computer program for enabling a recipient apparatus to acquire a content from a distributing apparatus. The computer program performs steps comprising a first storage step, a reproduction step, a saving request generation step, and a second storage step. The first storage step temporarily stores to a first storage device the content distributed from the distribution apparatus, and the reproduction step reproduces the content temporarily stored in the first storage step. The saving request generation step generates a saving request for permission to save the content, which is currently reproduced by the reproduction step. The second storage step, within the content currently reproduced by the reproduction step, saves to a non-volatile second storage device a portion which is distributed from the distributing apparatus after the saving request is generated. After the reproduction of the content in the reproduction step is completed, the second storage step further comprises saving any unsaved portion of the content which is transferred from the distributing apparatus or the first storage device.

It is contemplated that each of the aforementioned computer programs may be recorded on a recording medium. Recording medium as used throughout the specification is meant to be equivalent to a computer-readable recording medium or computer-readable storage medium capable of recording or storing one or more programs that are executable by a computer.

In accordance with each of the above aspects, the recipient apparatus begins saving a content which is distributed from a distributing apparatus while the reproduction of the content is still under way. After the reproduction of the content is completed, the recipient apparatus again acquires and saves an unsaved portion of the content whose reproduction has been completed. Thus, the need for the recipient apparatus to acquire identical portions of the content more than once can be minimized. As a result, an efficient content distribution is realized.

These and other objects, features, aspects and advantages of the present invention will become more apparent from the following detailed description of the present invention when taken in conjunction with the accompanying drawings.

DETAILED DESCRIPTION OF THE INVENTION

Figure 1:
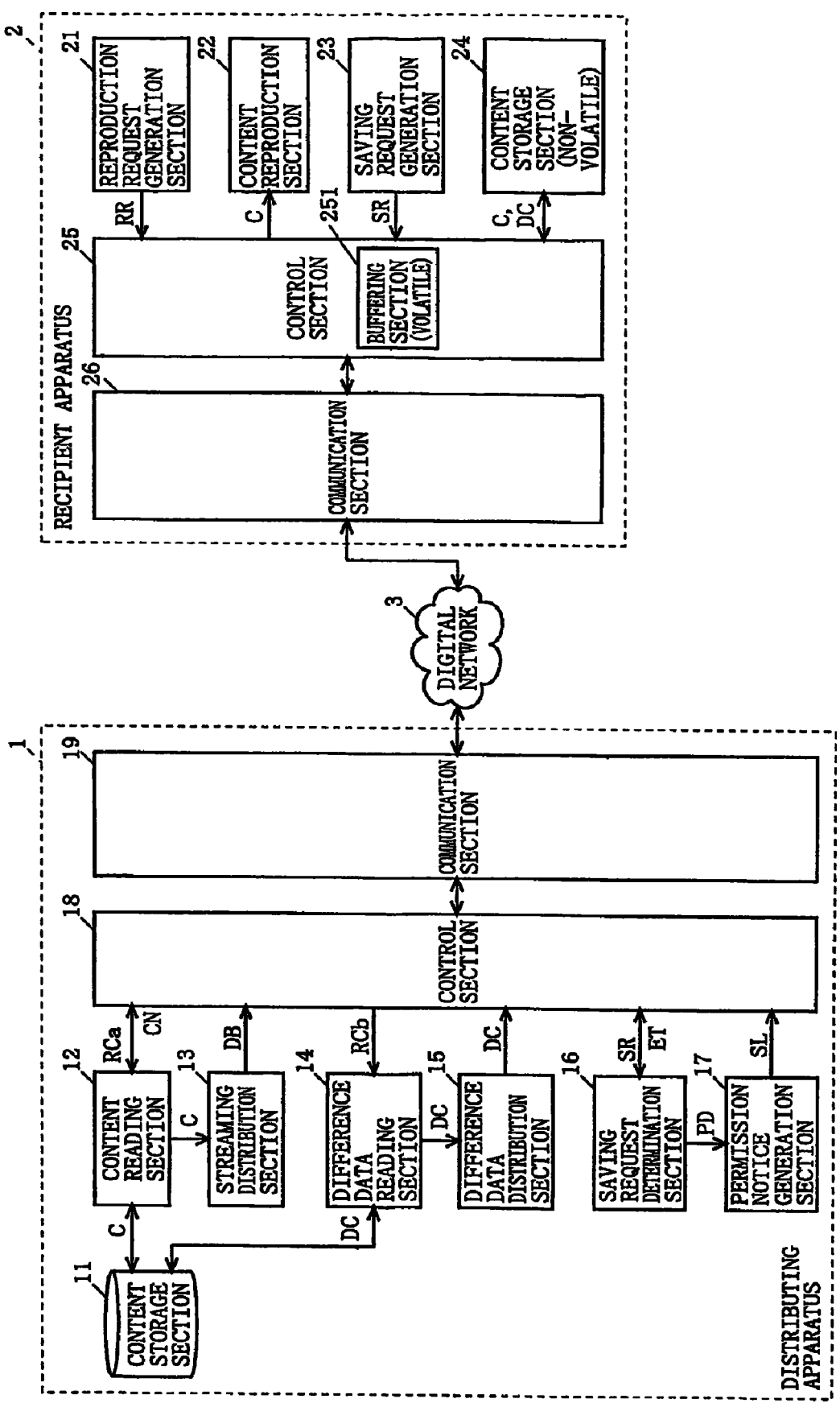
FIG. 1 is a block diagram illustrating the overall structure of a contents distribution system according to an embodiment of the present invention.

FIG. 1 is a block diagram illustrating the overall structure of a contents distribution system according to a first embodiment of the present invention. In FIG. 1, the contents distribution system comprises a distributing apparatus 1 and a recipient apparatus 2.

The distributing apparatus 1 performs content distribution while switching between streaming and downloading as necessary. In order to enable such a content distribution function, the distributing apparatus 1 comprises a content storage section 11, a content reading section 12, a streaming distribution section 13, a difference data reading section 14, a difference data distribution section 15, a saving request determination section 16, a permission notice generation section 17, a control section 18, and a communication section 19.

The content storage section 11 stores contents C, which is distributable from the distributing apparatus 1 to the recipient apparatus 2 via, for example, the digital network 3. In the present embodiment, it is assumed that each content C includes of data which varies over time from its beginning to end, e.g., an audio or video content.

In accordance with a read instruction RCa from the control section 18, the content reading section 12 reads a content C from the content storage section 11, and passes the content C thus read to the streaming distribution section 13.

According to streaming technique, the streaming distribution section 13 splits the incoming content C, which is sent from the content reading section 12, into data units of a predetermined size, thus generating a number of data blocks DB. The streaming distribution section 13 sequentially passes the generated data blocks DB to the control section 18.

In accordance with a read instruction RCb from the control section 18, the difference data reading section 14 reads a differential content DC from the content storage section 11, and passes the differential content DC thus read to the difference data distribution section 15. As used herein, the "differential content DC" is the portion of the content C to be distributed to the recipient apparatus 2 which has not yet been saved in the content storage section 24 of the recipient apparatus 2, as will be described in more detail later.

By to downloading technique, the difference data distribution section 15 passes the differential content DC received from the difference data reading section 14 to the control section 18.

From the control section 18, the saving request determination section 16 receives a saving request SR which is generated at the recipient apparatus 2. As used herein, the "saving request SR" is a piece of information which is used to request the distributing apparatus 1 for permission to save the content C into the content storage section 24 of the recipient apparatus 2. Based on the received saving request SR, the saving request determination section 16 determines whether or not to permit saving of the content C. When determining that saving permission is to be given, the saving request determination section 16 generates a determination PD (which is a piece of information indicating the permission), and passes the determination PD to the permission notice generation section 17. Furthermore, when determining that saving permission is to be given, the saving request determination section 16 obtains from a timer (not shown) a value of the time at which the determination to give a saving permission was made, and passes the received time value to the control section 18 as an end time ET.

In response to the determination PD from the saving request determination section 16, the permission notice generation section 17 generates a piece of information indicating the saving permission for the recipient apparatus 2 (hereinafter referred to as a "saving permission SL"), and passes the generated saving permission SL to the control section 18.

The control section 18 controls the constituent elements of the distributing apparatus 1. The processes to be performed by the control section 18 will be described later.

The communication section 19 receives the data which is sent from the recipient apparatus 2 over the digital network 3, subjects the received data to a predetermined processing, and thereafter passes each piece of processed information to the control section 18. Moreover, the communication section 19 subjects each piece of data which is sent from the control section 18 to a predetermined processing, and thereafter sends each piece of processed data onto the digital network 3. Note that the predetermined processing to be performed by the communication section 19 typically refers to processes to be performed in accordance with a communication protocol adopted by the digital network 3. The same also goes for the processing to be performed by the communication section 26 (described later).

FIG. 1 also illustrates that the recipient apparatus 2 works in cooperation with the distributing apparatus 1. In order to enable a content acquisition function, the recipient apparatus 2 comprises a reproduction request generation section 21, a content reproduction section 22, a saving request generation section 23, a content storage section 24, a control section 25, and a communication section 26.

The reproduction request generation section 21 generates a reproduction request RR, which is a piece of information used to request the distributing apparatus 1 for reproduction of a content C designated by a user of the recipient apparatus 2. The reproduction request generation section 21 passes the generated reproduction request RR to the control section 25.

The content reproduction section 22 receives the content C which is sent from the control section 25, and reproduces a signal representing audio or video from the received content C audio or video.

The saving request generation section 23 generates a saving request SR, which is a piece of information used to request the distributing apparatus 1 for permission to save the content C as designated by the user of the recipient apparatus 2. The saving request generation section 23 passes the generated saving request SR to the control section 25.

The content storage section 24 is a non-volatile storage device which does not lose data even after its supply power is terminated, e.g., a hard disk drive, a DVD (Digital Versatile Disc) drive, or a Blu-Ray® disc drive. The content storage section 24 saves the content C and the differential content DC which are sent from the control section 25. In the present embodiment, "saving" does not refer to a temporarily buffering of the content C to a volatile buffering section 251 (described later); rather, "saving" refers to backing-up of the content C and the differential content DC to the non-volatile content storage section 24.

The control section 25 controls the constituent elements of the recipient apparatus 2. The processes to be performed by the control section 25 will be described later. The control section 25 includes the buffering section 251, which is to be used for the reproduction of the content C that is distributed by streaming. The buffering section 251, which may typically be a main (volatile) memory of the recipient apparatus 2, temporarily buffers the content C to be reproduced by the content reproduction section 22.

The communication section 26 receives each piece of data which has been sent from the distributing apparatus 1 via the digital network 3, subjects each received piece of data to a predetermined processing, and thereafter passes the data to the control section 25. The communication section 26 subjects each piece of data which has been sent from the control section 25 to a predetermined processing, and thereafter sends the data onto the digital network 3.

Figure 2:
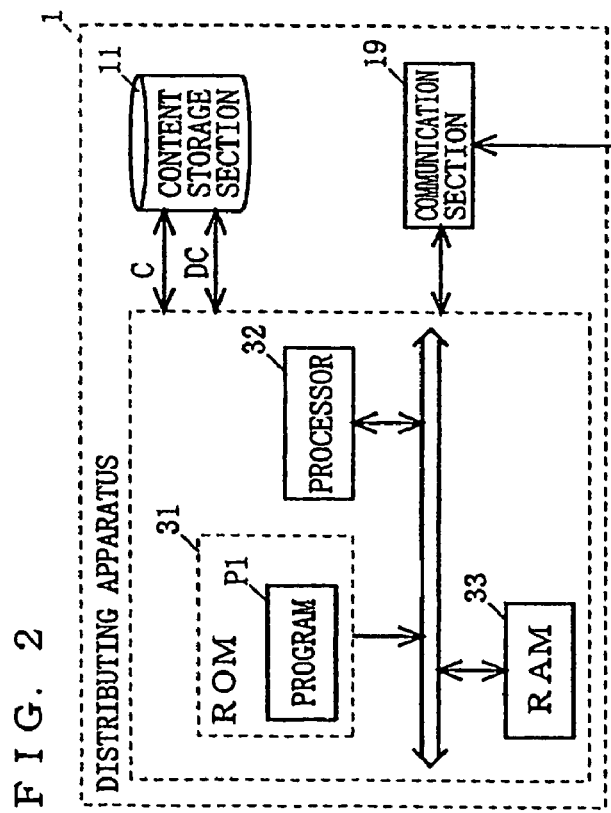
FIG. 2 is a schematic diagram illustrating an exemplary hardware structure of a distributing apparatus and a recipient apparatus illustrated in FIG. 1.
Figure 2:
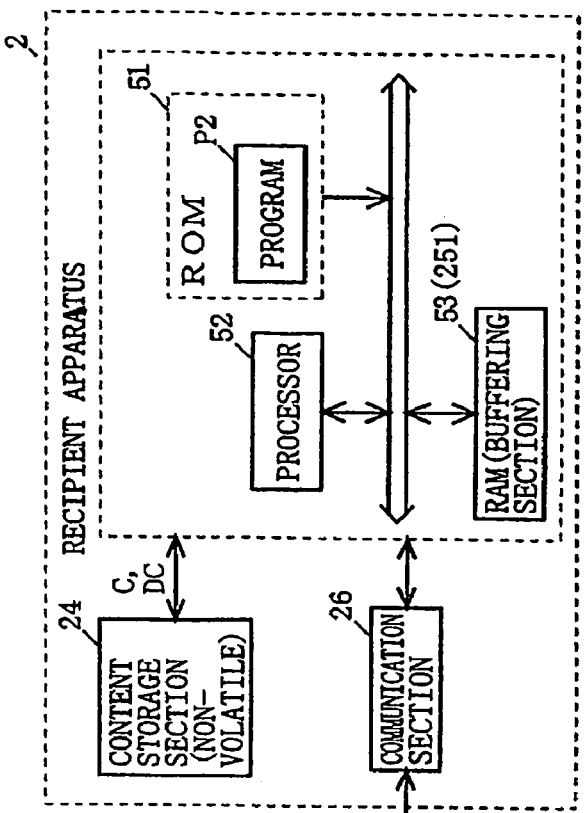

FIG. 2 is a schematic diagram illustrating an exemplary hardware structure of the distributing apparatus 1 and the recipient apparatus 2 illustrated in FIG. 1.

In FIG. 2, the distributing apparatus 1 includes a ROM (Read Only Memory) 31, a processor 32, and a RAM (Random Access Memory) 33, in addition to the content storage section 11 and the communication section 19 illustrated in FIG. 1.

The ROM 31 stores a computer program (hereinafter "program") P1. The program P1 mainly describes the content of the operation to be performed by the control section 18 (see FIG. 1).

The processor 32 executes the program P1 stored in the ROM 31 while using the RAM 33 as a work area.

As illustrated in FIG. 2, the recipient apparatus 2 includes a ROM 41, a processor 42, and a RAM 43, in addition to the content storage section 24 and the communication section 26 illustrated in FIG. 1.

The ROM 41 stores a computer program (hereinafter "program") P2. The program P2 mainly describes the content of the operation to be performed by the control section 25 (see FIG. 1).

The processor 42 executes the program P2 stored in the ROM 41 while using the RAM 43 as a work area.

The RAM 43 is also used as the buffering section 251 shown in FIG. 1.

Figure 3:
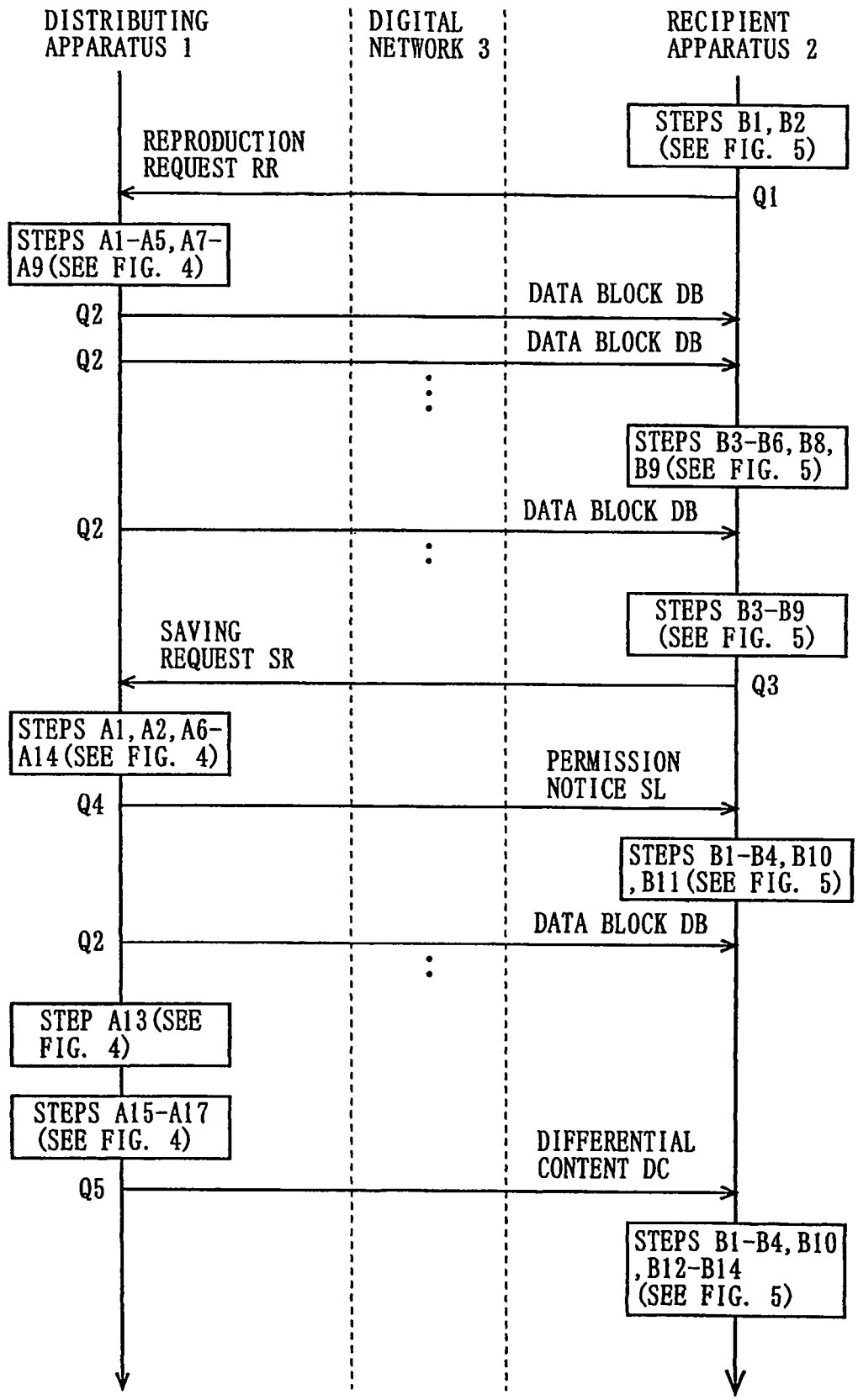
FIG. 3 is a schematic diagram illustrating a set of communication sequences performed between the distributing apparatus and the recipient apparatus illustrated in FIG. 1.

With reference to FIG. 3, a set of communication sequences performed between the distributing apparatus 1 and the recipient apparatus 2 in the contents distribution system having the above structure will be described with reference to FIG. 4. Additionally, a flow of control in a content distribution process to be performed by the distributing apparatus 1 will be described. With reference to FIG. 5, a flow of control in a content acquisition process to be performed by the recipient apparatus 2 will be described.

The recipient apparatus 2, which operates in accordance with the aforementioned program P2, first accesses the distributing apparatus 1 via the digital network 3 to obtain a list of content C which are available from the distributing apparatus 1, and displays the obtained list. Upon checking the displayed list, the user of the recipient apparatus 2 designates, by means of an input device (not shown), a content C which the user wishes to reproduce (FIG. 5; step B1). In the following description, the content C which has thus been designated by the user will be referred to as a "target content C".

The reproduction request generation section 21 generates a reproduction request RR for the target content C. The control section 25 passes the reproduction request RR generated by the reproduction request generation section 21 to the communication section 26. The communication section 26 subjects the reproduction request RR which has been sent from the control section 25 to a predetermined processing, and thereafter sends the processed reproduction request RR onto the digital network 3 (FIG. 5; step B2).

The reproduction request RR which has been sent out at step B2 is transmitted via the digital network 3, and received by the communication section 19 of the distributing apparatus 1 (FIG. 3; sequence Q1).

In the distributing apparatus 1 operates in accordance with the aforementioned program P1. In the distributing apparatus 1, the communication section 19 receives various data via the digital network 3 (FIG. 4; step A1), subjects the received data to a predetermined processing, and thereafter passes the processed data to the control section 18. The control section 18 determines whether the currently-received data is a reproduction request RR from the recipient apparatus 2 (FIG. 4; step A2).

If step A2 determines "YES", the control section 18 receives a current time from a timer (not shown), and stores the received time as a start time ST at which a content distribution by streaming was begun (step A3).

Moreover, the control section 18 sets a reproduction request flag to "ON", which by default is set to "OFF" (step A4). As used herein, the reproduction request flag is a flag indicating whether a reproduction request RR from the recipient apparatus 2 has been received or not. In the presently illustrated example, an "ON" reproduction request flag RR indicates that a reproduction request flag RR has already been received.

Furthermore, from the currently-received reproduction request RR, the control section 18 identifies the target content C whose reproduction is being requested by the recipient apparatus 2. The control section 18 manages the locations (hereinafter "storage locations") of the respective contents C within the content storage section 11. The control section 18 generates a read instruction RCa containing the storage location of the specified target content C, and passes the generated read instruction RCa to the content reading section 12. In accordance with the read instruction RCa sent from the control section 18, the content reading section 12 reads the target content C from the designated storage location (step A5).

According to streaming technique, the streaming distribution section 13 generates a data block DB from the target content C which has been read from the content reading section 12, and sequentially passes each generated data block DB to the control section 18. The streaming distribution section 13 repeats this operation.

After step A5, the control section 18 determines whether the currently-received data is a saving request SR (step A7). Detailed descriptions of the saving request SR are reserved here, but will be given later, in order to facilitate the understanding of the present embodiment. At this point, it is assumed that the currently-received data is a reproduction request RR. In this case, the control section 18 determines "NO" at step A7.

After making the above determination, the control section 18 determines whether the distribution of the target content C has been completed (step A8). At this point, it is assumed that the distribution of the target content C has not been begun yet. In this case, the control section 18 determines "NO" at step A8.

After making the above determination, the control section 18 sequentially passes the data blocks DB received from the streaming distribution section 13 to the communication section 19. The communication section 19 subjects the data blocks DB from the control section 18 to a predetermined processing, and sequentially sends out the processed data blocks DB to onto the digital network 3 (step A9).

The data blocks DB which have been sent out at step A9 are transmitted via the digital network 3, and received by the communication section 26 of the recipient apparatus 2 (FIG. 3; sequence Q2). The transmission of the data blocks DB is repeated until the recipient apparatus 2 sends out a saving request SR as described later.

At the recipient apparatus 2, the communication section 26 receives each data blocks DB which is sent via the digital network 3, and subjects each received data block DB to a predetermined processing. Each processed data block DB is sequentially transferred from the communication section 26 to the control section 25, so as to be sequentially buffered (i.e., temporarily stored) to the buffering section 251 within the control section 25. Thus, the control section 25 receives data blocks DB which include portions of the content C (FIG. 5; step B3).

Next, the control section 25 determines whether the data save flag is currently ON (FIG. 5; step B4).

Note that the data save flag indicates whether permission to save the target content C has already been given from the distributing apparatus 1. In the presently illustrated example, an "ON" data save flag indicates that a saving permission has already been given. In the present embodiment, it is assumed that the data save flag is set to "OFF" by default. At this point, the data save flag is still set to "OFF", and will be set to "ON" for the first time at step B9. In this case, the control section 25 determines "NO" at step B4.

After making the above determination, the control section 25 restores the data blocks DB temporarily stored in the buffering section 251 into a fragment of the target content C (hereinafter referred to as a "partial target content C"), and passes the partial target content C to the content reproduction section 22. Furthermore, the control section 25 discards the data blocks DB which are no longer needed because the partial target content C has already been passed to the content reproduction section 22 (step B5). Note that, at this point, the target content C is not saved to the non-volatile content storage section 24 through the process of step B5.

Each time receiving the target content C from the control section 25, the content reproduction section 22 reproduces a signal representing audio or video from the received target content C. The reproduced audio or video signal is output as audio or video by means of loudspeakers and a display device (not shown). Thus, the user can enjoy the audio or video.

If the user wishes to enjoy the currently-received audio or video content in its entirety, the user indicates so by operating an input device (not shown) of the recipient apparatus 2. In response to this user input, the saving request generation section 23 generates a saving request SR for the target content C, and passes the generated saving request SR to the control section 25.

After step B5, the control section 25 determines whether such a saving request SR has been received from the saving request generation section 23 (step B6). Upon determining "NO", the control section 25 skips step B7, and performs step B8.

On the other hand, if step B6 determines "YES", the control section 25 passes the currently-received saving request SR to the communication section 26. The communication section 26 subjects the saving request SR from the control section 25 to a predetermined processing, and thereafter sends the processed saving request SR out to the digital network 3 (step B7).

If step B6 determines "NO", or after the process of step B7 is over, the control section 25 determines whether a permission notice SL has been received from the distributing apparatus 1 (step B8). Note that a permission notice SL arrives at the recipient apparatus 2 only after a lapse of a certain period of time since a saving request SR is sent. Therefore, at this point, it is assumed that step B8 determines "NO". After making the above determination, the control section 25 performs step B3.

The saving request SR which has been sent out at step B7 is transmitted via the digital network 3, and received by the communication section 19 of the distributing apparatus 1 (FIG. 3; sequence Q3).

At the distributing apparatus 1, the communication section 19 subjects the saving request SR which has been received via the digital network 3 to a predetermined processing, and thereafter passes the processed saving request SR to the control section 18.

Figure 4:
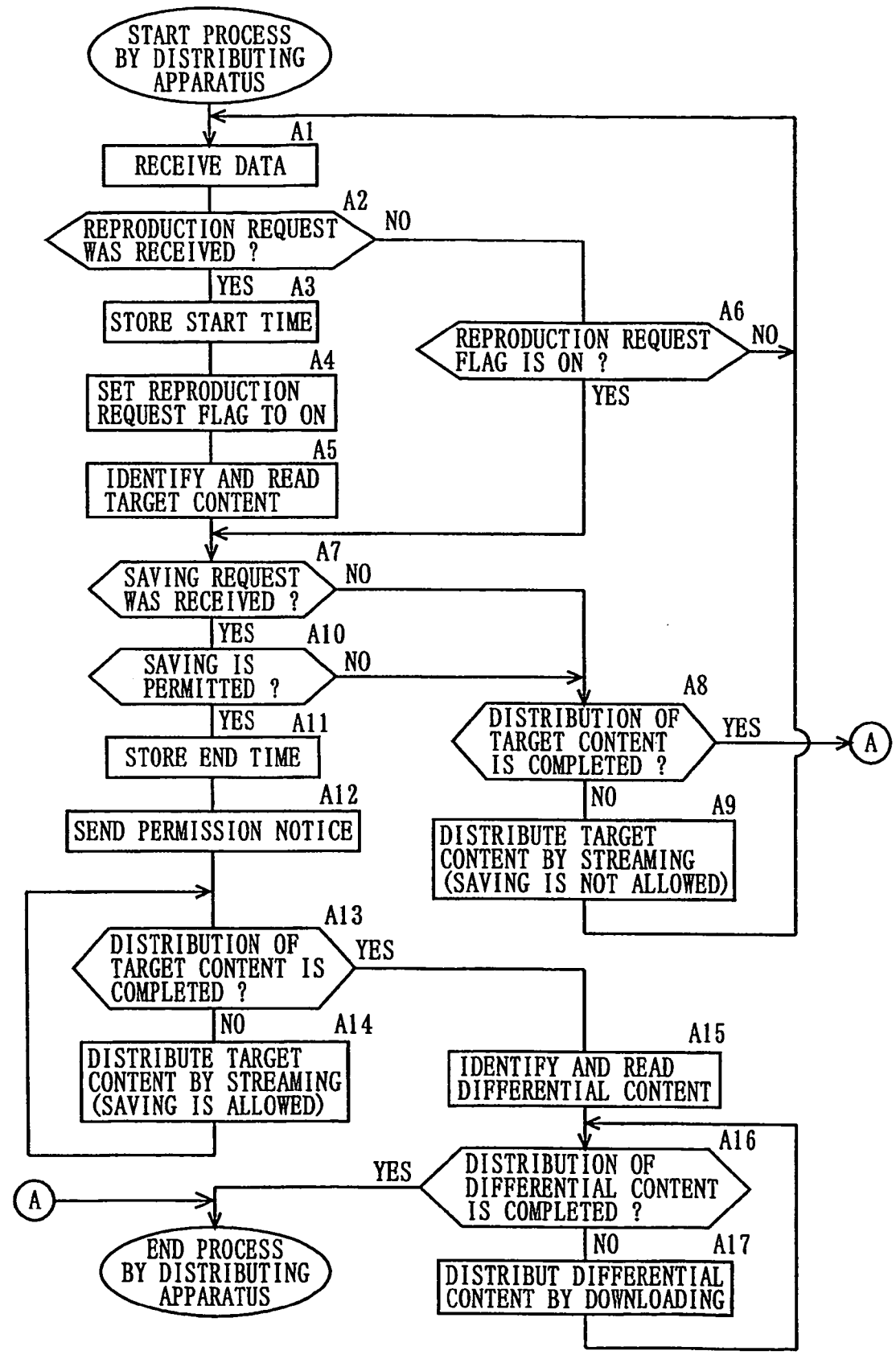
FIG. 4 is a flowchart illustrating a flow of control in a content distribution process performed by the distributing apparatus illustrated in FIG. 1.
Figure 5:
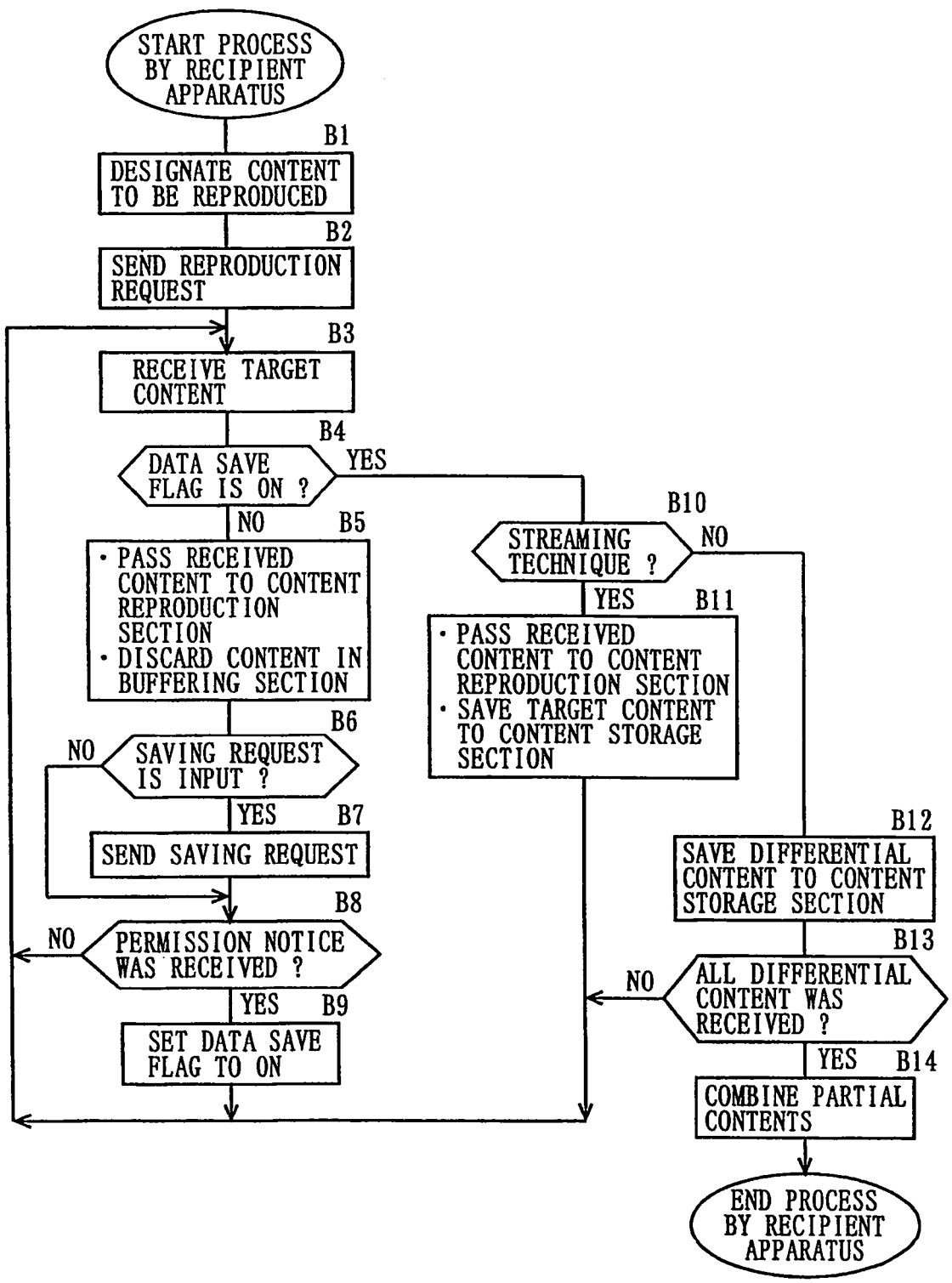
FIG. 5 is a flowchart illustrating a flow of control in a content acquisition process performed by the recipient apparatus illustrated in FIG. 1.

Note that the control section 18 is repeatedly performing the process in FIG. 4 even after executing step A9. If a saving request SR is received at step A1, the control section 18 determines at step A2 that no reproduction request RR has been received. In this case, the control section 18 determines whether the reproduction request flag is set to "ON" (step A6). If step A6 determines "NO", the control section 18 determines that a piece of data which is unrelated to the operation according to the present embodiment has been received, and hence awaits more data.

On the other hand, if step A6 determines "YES", it is possible for the currently-received data to be a saving request SR, and therefore step A7 is performed. Since a saving request SR has been sent this time, the control section 18 determines "YES" at step A7. After making the above determination, the control section 18 passes the current saving request SR to the saving request determination section 16. The saving request determination section 16 checks the information contained in the received saving request SR to determine whether or not to grant a saving permission for the target content C to the recipient apparatus 2 (step A10).

If step A10 determines "YES", the saving request determination section 16 generates a determination PD indicating a saving permission for the target content C, and passes the generated determination PD to the permission notice generation section 17. Furthermore, after sending the determination PD, the saving request determination section 16 receives a current time from a timer (not shown), and sends the received current time to the control section 18 as an end time ET of an unsaved portion of the target content C (i.e., a portion of the target content C which has not been saved in the recipient apparatus 2). The control section 18 stores the received end time ET (step A11).

Moreover, after receiving the determination PD from the saving request determination section 16, the permission notice generation section 17 generates a permission notice SL for the target content C. The generated permission notice SL is subjected to the processing by the control section 18 and the communication section 19 as in the case of any other data (e.g., the data blocks DB), and sent out onto the digital network 3 (step A12).

The permission notice SL which has been sent out at step A12 is transmitted via the digital network 3, and received by the communication section 26 of the recipient apparatus 2 (FIG. 3; sequence Q4).

At the recipient apparatus 2, the permission notice SL is subjected to the processing by the communication section 26 as in the case of any other data (e.g., the data blocks DB), and thereafter sent to the control section 25. The control section 25 is continuously performing the process shown in FIG. 5. If step B8 in FIG. 5 determines "YES", the control section 25 recognizes that a permission to save the content C (as restored from the data blocks DB to be sent from now) has been granted. Upon recognizing this, the control section 25 sets the data save flag to "ON" (FIG. 5; step B9).

Now, the description will temporarily revert to the processes performed by the distributing apparatus 1. After step A12 in FIG. 4, the control section 18 determines whether the distribution of the target content C has been completed (step A13).

In the present embodiment, it is assumed that the target content C is to be distributed from the distributing apparatus 1 to the recipient apparatus 2, from its beginning to end. Under this assumption, the content reading section 12 reads the entire target content C down to its end. Once the reading of the target content C is completed, the content reading section 12 generates a read completion notice CN, which is a piece of information indicating the completion of the reading of the target content C. The content reading section 12 sends the generated read completion notice CN to the control section 18.

When executing step A13, the control section 18 will determine that the distribution of the target content C has not been completed unless a read completion notice CN from the content reading section 12 has been received. In this case, the control section 18 distributes the target content C by streaming technique, as in step A9 (step A14). As a result, as shown in FIG. 3, the data blocks DB will keep being transmitted from the distributing apparatus 1 to the recipient apparatus 2 via the digital network 3, even after the permission notice SL is sent out (sequence Q2).

At the recipient apparatus 2, the control section 25 is performing the process shown in FIG. 5 even after executing step B9 shown in FIG. 5. When step B4 is performed in this process, the control section 25 will determine "YES". Thereafter, the control section 25 determines whether the target content C is currently being distributed by streaming technique (step B10).

Since the distributing apparatus 1 is currently distributing the target content C by streaming technique as described above, the control section 25 determines "YES" at step B10. After making the above determination, the control section 25 restores a partial target content C from the data blocks DB which are temporarily stored in the buffering section 251 currently, and passes the partial target content C to both the content reproduction section 22 and the content storage section 24. As in the case of step S3, the content reproduction section 22 reproduces a signal representing audio or video from the received target content C. Moreover, the content storage section 24 stores the target content C received from the control section 25 (step B11). During a content acquisition by streaming technique, each data block DB that is no longer needed is discarded as mentioned above. However, the restored target content C is saved to the non-volatile content storage section 24. In other words, in the recipient apparatus 2, a copy of the target content C begins to be generated after a permission notice SL is received. Stated otherwise, no copy of the target content C is generated during a content distribution by streaming technique until a permission notice SL (described later) is received by the control section 25.

As mentioned above, it is assumed in the present embodiment that the target content C is to be distributed from the distributing apparatus 1 to the recipient apparatus 2, from its beginning to end, through the processes described above with reference to FIGS. 3 to 5. Therefore, the distribution of the target content C will eventually be completed. In the case where the distributing apparatus 1 did not grant a saving permission for the target content C to the recipient apparatus 2 at step A10 in FIG. 4, the control section 18 ends the process shown in FIG. 4 when step A8 finds that the distribution of the target content C is completed.

On the other hand, the distributing apparatus 1 may grant a saving permission for the target content C to the recipient apparatus 2 at step A10 in FIG. 4. In this case, no complete copy of the target content C has been generated within the content storage section 24 even when the distribution of the target content C is completed, because the recipient apparatus 2 discarded the portion of the target content C which had been acquired until receiving the permission notice SL. Specifically, a portion of the target content C which was distributed from the start time ST to the end time ET is still missing.

In order to enable the recipient apparatus 2 to generate a complete copy of the target content C, when step A13 in FIG. 4 finds that the distribution of the target content C is completed, the control section 18 of the distributing apparatus 1 identifies a storage location of a portion of the target content C which has not yet been saved in the content storage section 24 of the recipient apparatus 2 (hereinafter referred to as a "differential content DC") by using values of the start time ST and the end time ET which are retained at that point. Then, the control section 18 generates a read instruction RCb containing the storage location of the differential content DC thus located, and passes the generated read instruction RCb to the difference data reading section 14. In accordance with the read instruction RCb sent from the control section 18, the difference data reading section 14 reads the differential content DC from the designated storage location (step A15). By downloading technique, the difference data distribution section 15 sequentially passes the differential content DC which is read from the difference data reading section 14 to the control section 18.

After step A15, the control section 18 determines whether the distribution of the differential content DC has been completed (step A16). If step A16 determines "NO", the control section 18 sequentially passes the differential content DC sent from the difference data distribution section 15 to the communication section 19. The communication section 19 subjects the differential content DC from the control section 18 to a predetermined processing, and sequentially sends out the processed differential content DC onto the digital network 3 by downloading technique (step A17). The control section 18 repeats step A17 until step A16 determines "YES", whereby the process shown in FIG. 4 is ended.

The differential content DC which has been sent out at step A17 is transmitted via the digital network 3, and received by the communication section 26 of the recipient apparatus 2 (FIG. 3; sequence Q5).

The recipient apparatus 2 is continuously performing the process shown in FIG. 5. The communication section 26 subjects the differential content DC which has been sent via the digital network 3 to a predetermined processing. The processed differential content DC is sequentially transferred from the communication section 26 to the control section 25, and buffered into the buffering section 251 within the control section 25.

In the control section 25, the data save flag is currently set to "ON", and distribution by streaming technique is not being currently performed (that is, distribution by downloading technique is being currently performed). Therefore, after steps B4 and B10 in FIG. 5 are performed, the buffered differential content DC is passed to the content storage section 24. The content storage section 24 stores the differential content DC from the control section 25 (FIG. 5; step B12).

Thereafter, the control section 25 determines whether all of the differential content DC has been received (step B13). If step B13 determines "NO"; the control section 25 performs step B3 in order to obtain the rest of the differential content DC.

On the other hand, if step B13 determines "YES", it is known that the entire target content C (which represents one complete piece of music or video) has been saved to the content storage section 24. Thus, the control section 25 combines the saved differential content DC with the portion of the target content C which was saved after receiving the permission notice SL, thereby generating a complete copy of the target content C within the content storage section 24 (step B14). Although such a synthesis method is well known, it is preferable that the control section 25 once decodes the saved differential content DC and the portion of the target content C which was saved after receiving the permission notice SL in order to temporarily restore the unencoded complete target content C, and again encodes the restored target content C, in order to generate a high quality copy of the content C in the content storage section 24. As a result, the boundary between the saved differential content DC and the portion of the target content C which was saved after receiving the permission notice SL can be made seamless during reproduction.

Figure 6:
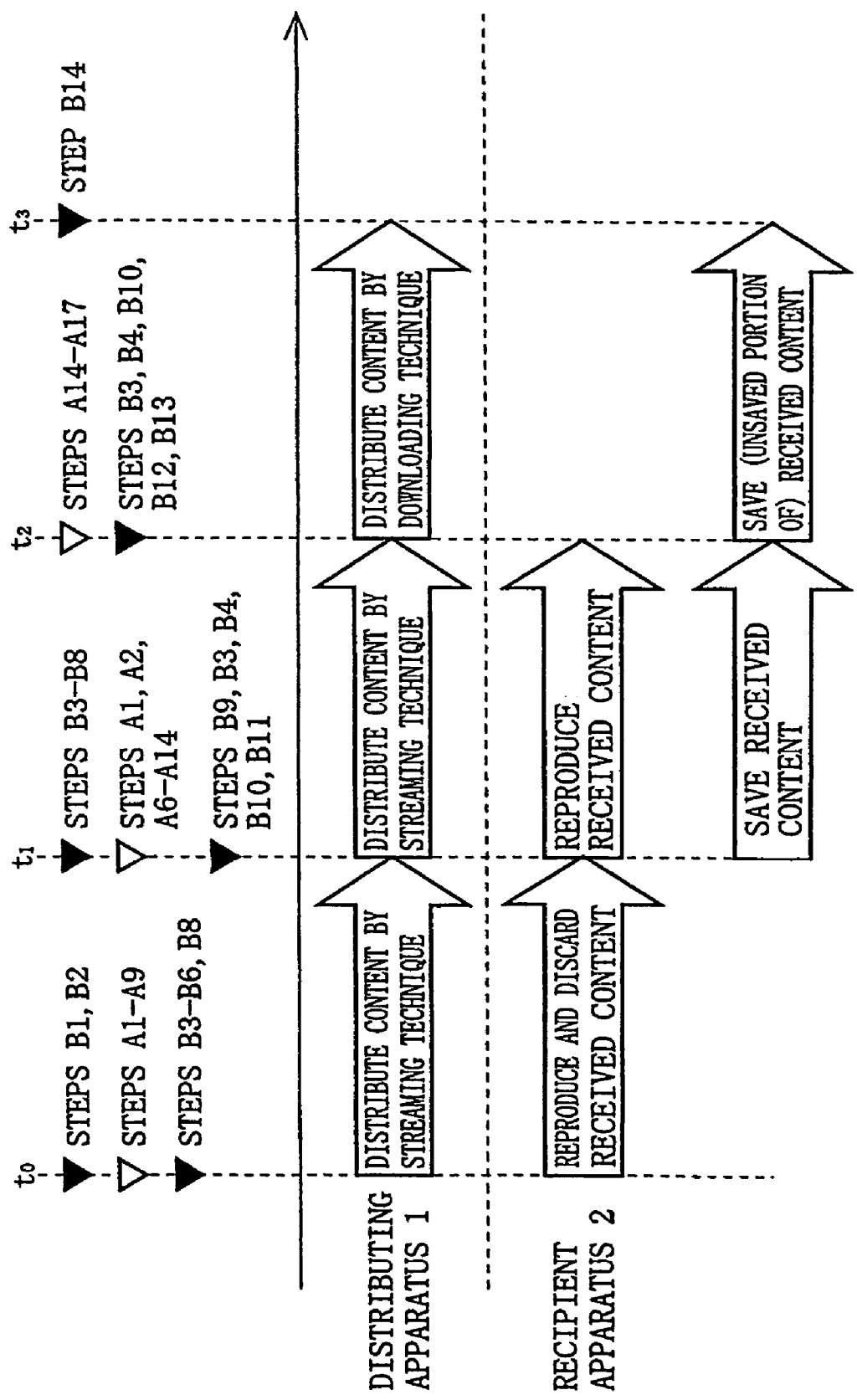
FIG. 6 is a timing chart illustrating a content distribution performed by the distributing apparatus and a content acquisition performed by the recipient apparatus illustrated in FIG. 1.

Referring to FIG. 6, in the above processes, if the recipient apparatus 2 generates and transmits a reproduction request RR at time $t_0$, the distributing apparatus 1 begins distributing the target content C by streaming technique. At this time, the recipient apparatus 2 reproduces the received target content C. However, since the recipient apparatus 2 has not received a permission notice SL from the distributing apparatus 1, the recipient apparatus 2 discards those data blocks DB which are no longer needed because so much of the target content C has been reproduced, without saving the data blocks DB to the non-volatile content storage section 24. As a result, copies of the target content C can be prevented from being generated in the recipient apparatus 2 unless the distributing apparatus 1 issues a permission notice SL. It is also beneficial for the recipient apparatus 2 that no unnecessary copies of the target content C are generated in itself before sending a saving request SR.

If the recipient apparatus 2 generates and transmits a saving request SR at time $t_1$ which comes after time $t_0$, the distributing apparatus 1 transmits a permission notice SL to the recipient apparatus 2 (that is, if the distributing apparatus 1 permits saving of the target content C). At any point after time $t_1$, the distributing apparatus 1 is operating in the same manner as between time $t_0$ and time $t_1$ in that the distributing apparatus 1 is distributing the target content C by streaming technique. However, after time $t_1$, the recipient apparatus 2 not only reproduces the target content C but also saves the target content C to the non-volatile content storage section 24. As a result, at time $t_1$, a copy of the target content C is generated.

At time $t_2$ which comes after time $t_1$, the distribution of the target content C by streaming technique is completed. Thereafter, the distributing apparatus 1 distributes the differential content DC to the recipient apparatus 2 by downloading technique. The differential content DC is the portion of the target content C which was distributed to the recipient apparatus 2 between time $t_0$ and time $t_1$ but was not saved in the recipient apparatus 2. Therefore, when the saving of the differential content DC by downloading technique is completed, the recipient apparatus 2 has obtained the complete target content C.

In a conventional content distribution, after a user has listened to a sample content or viewed a movie preview, the user cannot enjoy the complete content until the downloading process at the recipient apparatus is completed. On the other hand, according to the present invention, the content distribution between the distributing apparatus 1 and the recipient apparatus 2 allows the recipient apparatus 2 to reproduce the entire target content C through the streaming process between time $t_0$ and $t_2$, thus allowing the user to enjoy the entire target content C so much earlier. Moreover, since the recipient apparatus 2 is allowed to generate a copy of a portion of the target content C which is sent between time $t_1$ and time $t_2$, the amount of time required to save the complete content C can be reduced as compared to that required conventionally.

At step A10 in FIG. 4, if the saving request determination section 16 decides not to give a saving permission for the target content C, the control section 18 performs step A8. In this case, the distributing apparatus 1 may send to the recipient apparatus 2 information indicating that a saving permission for the target content C is not granted, for example.

Although the above illustrates an example where the content C is distributed via the digital network 3, the present invention is not limited thereto. The content C may be distributed via any medium of communications including broadcasting, wireless communications and wired communications. In the case of broadcasting, however, only a downlink from the distributing apparatus 1 to the recipient apparatus 2 can be established. Therefore, it would be necessary to employ another medium of communications (wireless communications or wired communications) to enable the recipient apparatus 2 to send information to the distributing apparatus 1.

Although the above illustrates an example where the distribution of the differential content DC by downloading technique is begun immediately after the distribution of the target content C by streaming technique is completed, the present invention is not limited thereto. Since the user has partially enjoyed the target content C between time $t_0$ and $t_i$ (see FIG. 6), the differential content DC may be begun after the lapse of an arbitrary amount of time, rather than immediately following, after the completion of the distribution of the target content C by streaming technique.

Preferably, in the streaming period before issuing a permission notice SL, the distributing apparatus 1 distributes the target content C in a format which does not allow saving to the content storage section 24, and in the streaming period after the issuance of a permission notice SL, the distributing apparatus 1 distributes the target content C in a format which allows saving to the content storage section 24.

Although the above illustrates an example where the transition to downloading occurs immediately after the distribution of the target content C by streaming technique is completed, the present invention is not limited thereto. Alternatively, the recipient apparatus 2 may send to the distributing apparatus 1 a request to terminate the streaming distribution, in response to which the distributing apparatus 1 may switch to downloading to distribute a differential content DC and any portion of the target content C which has not been distributed yet.

The above illustrates an example where a portion of the target content C which is distributed by streaming technique is merely allowed to be saved to the content storage section 24. However, for reasons such as congestions in the digital network 3, some data blocks DB may possibly be lost. Therefore, it is preferable that, after receiving the permission notice SL, the control section 25 of the recipient apparatus 2 identifies any lost data blocks DB on the basis of numbers which are assigned to data blocks DB in common practice, and requests the distributing apparatus 1 to resend the lost data blocks DB. Note that the lost data blocks DB may be resent by either streaming technique or downloading technique.

In some cases, the distributing apparatus 1 may distribute a relatively low-quality version of the target content C during streaming. In such cases, it is preferable that the distributing apparatus 1 distributes, during downloading, not only the differential content DC but also a high-quality version of the target content C pertaining to the portion which was not sent during streaming.

In some cases, the distributing apparatus 1 may distribute the content C only during a time slot scheduled by a content distributor of the content C, so that the user may fail to enjoy the beginning of the content C. In order to cope with this situation, it is preferable that the distributing apparatus 1 distributes not only the differential content DC but also any portion which the recipient apparatus 2 has failed to acquire.

In the case where there is a sufficient bandwidth available on the digital network 3 after a permission notice SL has been sent, the distributing apparatus 1 may distribute to the recipient apparatus 2, by downloading technique, a portion of the target content C which was distributed before the issuance of the permission notice SL.

The above embodiment illustrates an example where the programs P1 and P2 are stored in the ROM31 of the distributing apparatus 1 and in the ROM41 of the recipient apparatus 2, respectively. Alternatively, the programs P1 and P2 may be made available in a recorded form on a recording medium such as a CD-ROM. Further alternatively, the programs P1 and P2 may be made available via a network.

Figure 7:
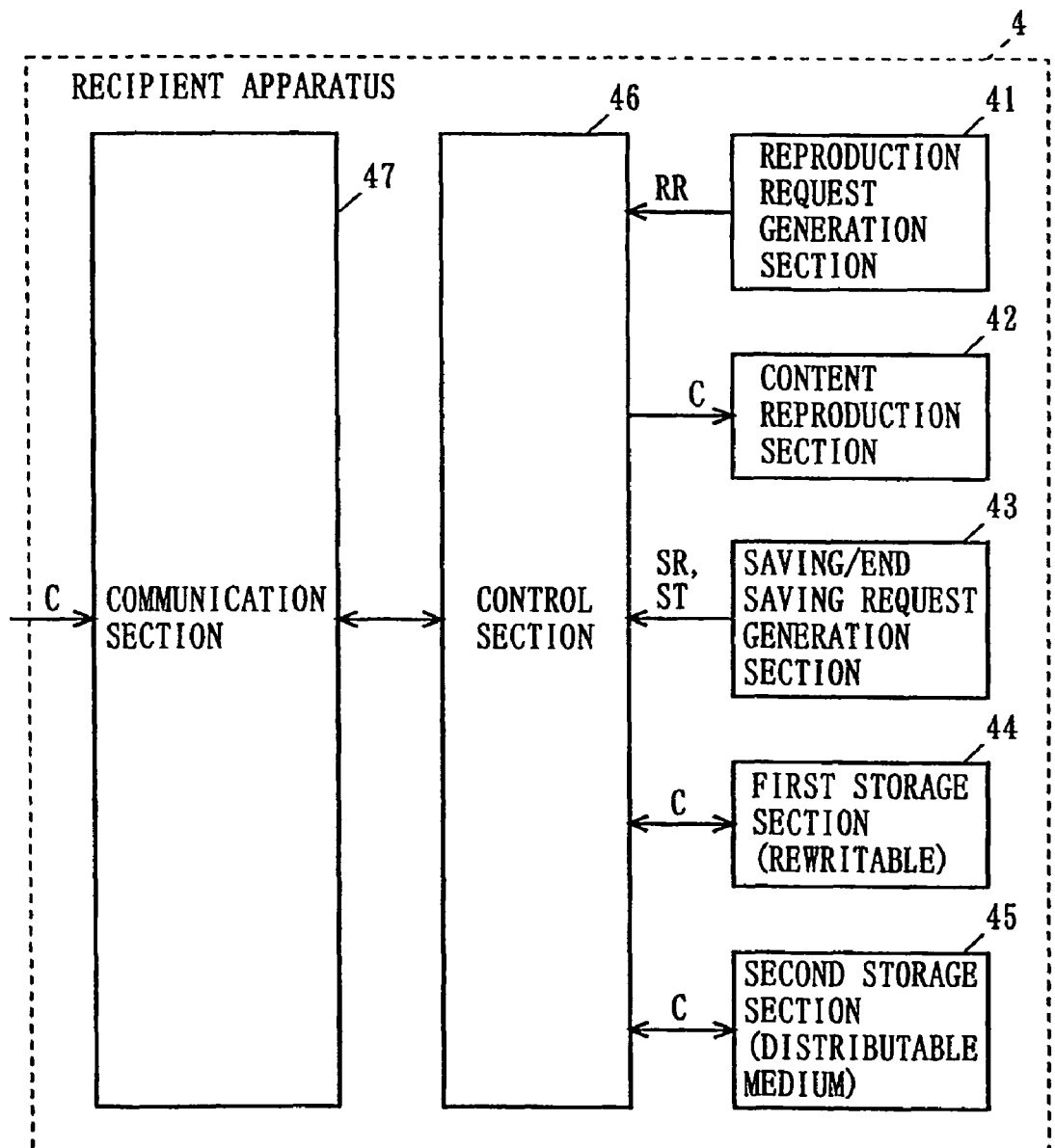
FIG. 7 is a block diagram illustrating the structure of a recipient apparatus according to a second embodiment of the present invention.

FIG. 7 is a block diagram illustrating the overall structure of a recipient apparatus 4 according to a second embodiment of the present invention. In the present embodiment, the distributing apparatus is a server on a network which may typically be the Internet, although the present invention is not limited thereto. The distributing apparatus may alternatively be a broadcasting station which broadcasts contents, or a center station for cable television, so long as the distributing apparatus is capable of distributing contents to a recipient apparatus.

As shown in FIG. 7, in order to enable a content acquisition function, the recipient apparatus 4 comprises a reproduction request generation section 41, a content reproduction section 42, a saving/end saving request generation section 43, a first storage section 44, a second storage section 45, a control section 46, and a communication section 47.

The reproduction request generation section 41 generates a reproduction request RR, which is a piece of information used to request the control section 46 for reproduction of a content C that a user of the recipient apparatus 4 desires to reproduce. The reproduction request generation section 41 passes the generated reproduction request RR to the control section 46. For example, the reproduction request RR may be a piece of information designating a channel on which the target content C is distributed.

In accordance with the content C sent from the control section 46, the content reproduction section 42 reproduces a signal representing audio or video.

The saving/end saving request generation section 43, typically in response to the user's operation, generates a saving request SR, which is a piece of information used to request the control section 46 for permission to save the target content C information. The saving/end saving request generation section 43 passes the generated saving request SR to the control section 46. Moreover, typically in response to the user's operation, the saving/end saving request generation section 43 generates an end saving request ST, which is a piece of information used to request the control section 46 to end saving of the target content C. The saving/end saving request generation section 43 passes the generated end saving request ST to the control section 46.

The first storage section 44 includes a storage medium which permits rewriting, e.g., a hard disk. The first storage section 44 temporarily stores the target content C during a period which substantially begins at the generation of the reproduction request RR and substantially ends at the generation of the saving request SR. The storage medium in the first storage section 44 is preferably capable of accommodating a large amount of data so as to be able to temporarily store a large amount of contents C, or long contents C.

The second storage section 45 includes a non-volatile storage medium, e.g., a CD-R, a DVD (Digital Versatile Disc) or a Blu-Ray® disc. The second storage section 45 performs saving of the target content C during a period which substantially begins at the generation of the saving request SR and substantially ends at the completion of data transfer from the first storage section 44. In the present embodiment, "saving" means writing the target content C to the non-volatile second storage section 45 for backing up, as contrasted to the temporarily storage of the content C in the first storage section 44. From the perspective of backing up contents C according to the liking of the user, the second storage section 45 is preferably a distributable medium which is removal from the recipient apparatus 4 and is portable.

The control section 46 controls the constituent elements of the recipient apparatus 4. The processes to be performed by the control section 46 will be described later.

The communication section 47 at least receives a content C which is sent from a distributing apparatus (not shown), and passes the received content C to the control section 46. In the case where the distributing apparatus is a server as mentioned above, the communication section 47 is a network interface for receiving contents which are sent via a network. In the case where the distributing apparatus is a broadcasting station or a center station, the communication section 47 is a tuner for receiving contents which are transmitted by broadcasting.

In the recipient apparatus 4 having the above structure, at least the control section 46 may be composed of a ROM, a processor, and a RAM, as in the case of the first embodiment. In this case, the ROM will store a computer program which mainly describes the content of the operation to be performed by the control section 46.

Figure 8:
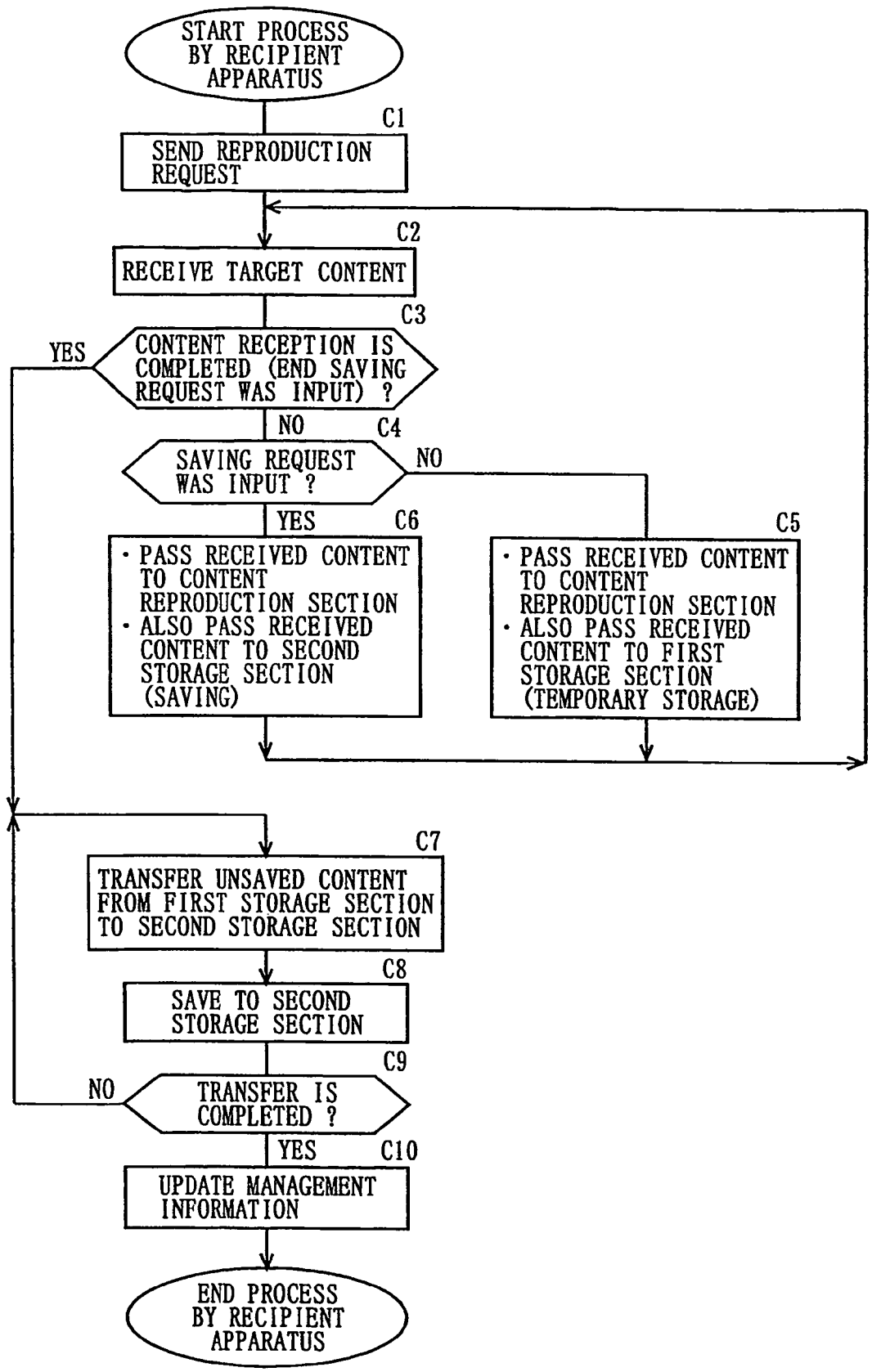
FIG. 8 is a flowchart illustrating a flow of processes performed by the recipient apparatus illustrated in FIG. 7.

With reference to FIG. 8, a flow of control in a content acquisition process to be performed by the recipient apparatus 4 in the contents distribution system having the above structure will be described below.

After the recipient apparatus 4 is booted, the recipient apparatus 4 begins operating in accordance with the aforementioned computer program. Thereafter, the user designates a desired content C ("a target content C"). The reproduction request generation section 41 generates a reproduction request RR for the target content C, and passes the reproduction request RR to the control section 46 (FIG. 8; step C1). In order to enable the communication section 47 to receive the target content C, the control section 46 performs processes such as setting a channel for the communication section 47 and establishing a connection with a distributing apparatus (e.g., a server) on the network. After step C1, the communication section 47 passes the target content C sent from the distributing apparatus to the control section 46.

After step C1, the control section 46 determines whether the reception of the content C has been completed (step C3). As an example, the present embodiment illustrates a case where the control section 46 determines that the reception of the content C has been completed if an end saving request ST from the saving/end saving request generation section 43 has been received at step C3. Alternatively, the control section 46 may automatically detect the completion of the distribution of the content C, and determine that the reception of the content C has been completed at this point.

At this point, the content C has just begun to be received, as mentioned above; therefore, the following description of the processes of the recipient apparatus 4 assumes that the control section 46 determines "NO" at step C3. When this determination is made, the control section 46 then determines whether a saving request SR has been received from the saving/end saving request generation section 43 (step C4). If no saving request SR has been received, the control section 46 determines that the user does not wish to save the currently-received content C to the second storage section 45. On the other hand, if a saving request SR has been received, the control section 46 determines that the user wishes to save the currently-received content C to the second storage section 45.

At this point, it is assumed that the control section 46 has not received a saving request SR. In this case, the control section 46 passes the currently-received content C to both the content reproduction section 42 and the first storage section 44 (step C5). The content reproduction section 42 reproduces a signal representing audio or video from the received content C. The reproduced audio or video signal is output as audio or video by means of loudspeakers and a display device (not shown). Thus, the user can enjoy the audio or video. The first storage section 44 temporarily stores the content C received from the control section 46 to an internal storage medium.

After step C5, the control section 46 returns to step C2. Through these processes, after the target content C begins to be received, the first storage section 44 temporarily stores the target content C while both steps C3 and C4 determine "NO". During this period, the user can enjoy the audio or video represented by the target content C.

Assuming that the user decides to save the target content C to the distributable medium in the second storage section 45, the user operates an input device (not shown) to indicate the desire to save the target content C. In response to this operation, the saving/end saving request generation section 43 generates a saving request SR and passes the generated saving request SR to the control section 46, which is continuously performing the process shown in FIG. 8. When step C4 is performed when or after receiving the saving request SR, the control section 46 determines "YES". If this determination is made, the control section 46 passes the currently-received content C to both the content reproduction section 42 and the second storage section 45 (step C6). As a result, the user can enjoy the audio or video which are output by means of loudspeakers and a display device (not shown). Meanwhile, the second storage section 45 saves the content C received from the control section 46 to an internal storage medium (distributable medium). In other words, after the saving request SR is received, the target content C is saved to the distributable medium in the second storage section 45.

After step C6, the control section 46 returns to step C2. Through these processes, after the target content C begins to be received, the target content C is saved to the second storage section 45 while step C3 determines "NO" and step C4 determines "YES".

Assuming that the user has enjoyed the entire target content C, the user operates an input device (not shown) to indicate to the recipient apparatus 4 that the reception of the target content C is to be ended. In response to this operation, the saving/end saving request generation section 43 generates an end saving request ST and passes the generated end saving request ST to the control section 46, which is continuously performing the process shown in FIG. 8. When step C3 is performed during or after receiving the saving request SR, the control section 46 determines "YES". If this determination is made, the control section 46 transfers the partial target content C which is temporarily stored in the first storage section 44 to the second storage section 45, in order to generate a complete copy of the target content C in the second storage section 45. Note that the partial content C which is temporarily stored in the first storage section 44 has not been saved to the second storage section 45 at this point. What has been saved to the second storage section 45 at this point is the portion of the target content C which was received by the recipient apparatus 4 after the saving request SR was generated. The second storage section 45 saves the target content C which is transferred from the first storage section 44 to an internal storage medium (distributable medium) (step C8).

Until the transfer of the partial target content C stored in the first storage section 44 is completed (step C9), the control section 46 controls the data transfer from the first storage section 44 to the second storage section 45. If step C9 finds that the data transfer is completed, the control section 46 updates management information associated with the partial target content C stored in the second storage section 45 (step C10). Specifically, in the present embodiment, the target content C is saved to the second storage section 45 in a plurality of units. Thus, a plurality of partial target contents C are saved to the second storage section 45, and a plurality of pieces of management information therefor are accordingly generated. Hence, the control section 46 updates the management information for the target content C so that the partial contents C can be handled as one complete target content C.

In the case where the second storage section 45 includes a rewritable medium, the control section 46 may alternatively perform at step C10 a process similar to the aforementioned step B14. In order to generate a high quality copy of the content C in the second storage section 45, it is preferable that the control section 46 once decodes the partial contents C to restore a complete target content C and again encodes the restored target content C.

Figure 9:
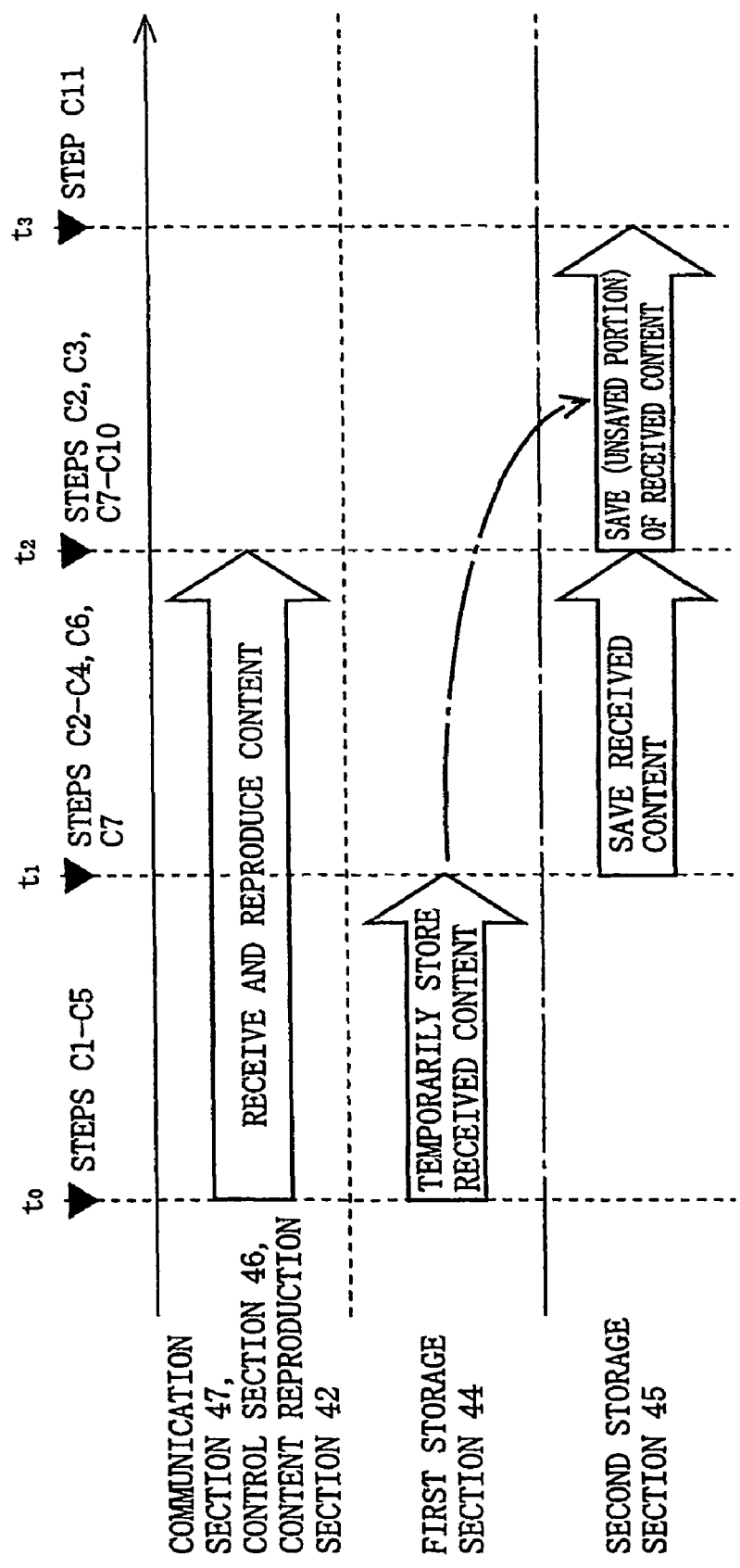
FIG. 9 is a timing chart illustrating a content acquisition performed by the recipient apparatus illustrated in FIG. 7.

Referring to FIG. 9, in the above processes, if the recipient apparatus 4 generates a reproduction request RR at time $t_0$, the recipient apparatus 4 reproduces the target content C being received. Since the recipient apparatus 4 has not generated a saving request SR yet, the recipient apparatus 4 assumes that the user may wish to save the target content C to the second storage section 45 in the near future, although the user has not yet indicated so. Accordingly, the content C being received is temporarily stored to the first storage section 44, which is preferably capable of accommodating a large amount of data and rewritable. If the recipient apparatus 4 generates a saving request SR at time $t_1$ which comes after time $t_0$, the recipient apparatus 4 determines that the user now desires to save the target content C, and therefore begins to save the target content C to the storage medium (distributable medium) in the second storage section 45, in addition to reproducing the target content C.

If the reception of the content C is completed at time $t_2$ which comes after time $t_1$, the recipient apparatus 4 generates a copy of the current target content C in the second storage section 45 after performing a data transfer from the first storage section 44 to the second storage section 45.

In the present embodiment, as in the case of the first embodiment, the amount of time required to generate a complete copy of the target content C in the recipient apparatus 4 can be reduced as compared to that required conventionally.

In some cases, the user may wish to save a content to the second storage section 45 in the middle of viewing (listening to) the content. In order to satisfy such a need, in the recipient apparatus of the present embodiment, the first storage section 44 temporarily stores the content irrespective of the user's intent. If the user thereafter operates an input device (not shown) for saving the content, the currently-reproduced content begins to be saved to the second storage section 45. After the content reproduction is completed, the unsaved portion of the content is transferred from the first storage section 44 to the second storage section 45, whereby the entire content is saved to the second storage section 45. Thus, a recipient apparatus which is convenient to the user can be provided.

In the case where the second storage section 45 includes a write-once type distributable medium, e.g., a DVD-R, a DVD+R, or a CD-R, the technique according to the present embodiment of temporarily storing the currently-reproduced content C to the first storage section 44 and generating a copy of the content C on the write-once type distributable medium after a saving request is issued by the user is very effective, because it can prevent any content C that is unwanted by the user from being saved to the write-once type distributable medium in vain.

The present embodiment illustrates an example where a portion of the target content C which is received between time $t_0$ and time $t_1$, i.e., after the reception of the target content C is begun and until the saving request SR is generated, is temporarily stored to a local first storage section 44 of the recipient apparatus 4, although the present invention is not limited thereto. Alternatively, as exemplified by the method of acquiring difference data according to the first embodiment, the recipient apparatus 4 may acquire from a remote distributing apparatus a partial target content C which was received and reproduced between time $t_0$ and time $t_1$ in order to generate a copy of the target content C in the second storage section 45. In this case, however, bi-directional communication links, a downlink, and an uplink, for example, need to be established between the recipient apparatus 4 and the distributing apparatus. Furthermore, in this case, the distributing apparatus must be provided with a function of distributing, in response to a request from the recipient apparatus 4, any partial content C which was transmitted between time $t_0$ and time $t_1$ but has not been saved in the recipient apparatus 4.

In the present embodiment, too, the computer program for implementing the functions of the recipient apparatus 4 may be made available in a recorded form on a recording medium such as a CD-ROM. Recording medium as used throughout the specification is meant to be equivalent to a computer-readable recording medium or computer-readable storage medium capable of recording or storing one or more programs that are executable by a computer. Further alternatively, this computer program may be made available via a network.

While the invention has been described in detail, the foregoing description is in all aspects illustrative and not restrictive. It is understood that numerous other modifications and variations can be devised without departing from the scope of the invention.

The contents distribution system according to the present invention is useful for applications which require the technological effect of efficient transmission and reception of contents between a distributing apparatus and a recipient apparatus, such as contents distribution over the Internet.

The invention claimed is:

1. A recipient apparatus for acquiring a content from a distributing apparatus, comprising:
    a first storage section that comprises a non-volatile memory and buffers pieces of the content distributed from the distributing apparatus by a streaming technique for a preview;
    a reproduction section that successively reproduces to an output device the piece of the content being buffered to said first storage section;
    a saving request generation section that generates, during the reproduction of the content distributed by the streaming technique for the preview, a saving request for permission to save the whole of the content; and
    a non-volatile second storage section that saves, in the case where the saving request is generated during the reproduction of the content for the preview, a first partial content of the content as first saving data, the first partial content being distributed from the distributing apparatus by a streaming technique and successively reproduced by said reproduction section after the saving request is generated, wherein, in the case where the saving request is generated during the reproduction of the content for the preview, the non-volatile second storage section further saves a second partial content of the content as second saving data, the second partial content being distributed from the distributing apparatus by a downloading technique according to the saving request and corresponding to the pieces of content distributed from the distributing apparatus by the streaming technique and reproduced for the preview by said reproduction section before the saving request is generated, and wherein, in the case where the saving request is generated during the reproduction of the content for the preview, the first saving data and the second saving data are saved in the non-volatile second storage section to acquire the whole of the content.

2. The recipient apparatus according to claim 1, wherein the recipient apparatus further comprises a synthesis section that combines the first and second saving data saved to the second storage section.

3. The recipient apparatus according to claim 1, wherein the recipient apparatus further comprises an update section that updates management information used for the first and second saving data saved to the second storage section.

4. An acquisition method for acquiring a content from a distributing apparatus, comprising:
   a first storage step of buffering to a first storage device pieces of the content distributed from the distributing apparatus by a streaming technique for a preview;
   a reproduction step of successively reproducing the pieces of the content buffered in said first storage step;
   a saving request generation step of generating, during the reproduction of the content distributed by the streaming technique for the preview, a saving request for permission to save the whole of the content; and
   a second storage step of, in the case where the saving request is generated during the reproduction of the content for the preview, saving to a non-volatile second storage device a first partial content of the content, the first partial content being distributed from the distributing apparatus by a streaming technique and successively reproduced by said reproduction step after the saving request is generated,
   wherein, in the case where the saving request is generated during the reproduction of the content for the preview, said second storage step further comprises saving a second partial content of the content, the second partial content being distributed from the distributing apparatus by a downloading technique according to the saving request and corresponding to the pieces of content distributed from the distributing apparatus by the streaming technique and reproduced for the preview by said reproduction step before the saving request is generated, and
   wherein, in the case where the saving request is generated during the reproduction of the content for the preview, the first saving data and the second saving data are saved in the non-volatile second storage device to acquire the whole of the content.

5. A computer program encoded on a computer-readable recording medium and including executable instructions, which when executed perform steps for enabling a recipient apparatus to acquire a content from a distributing apparatus, comprising:
   a first storage step of buffering to a first storage device the pieces of content distributed from the distributing apparatus by a streaming technique for a preview;
   a reproduction step of successively reproducing the pieces of the content buffered in said first storage step;
   a saving request generation step of generating, during the reproduction of the content distributed by the streaming technique for the preview, a saving request for permission to save the whole of the content; and
   a second storage step of, in the case where the saving request is generated during the reproduction of the content for the preview, saving to a non-volatile second storage device a first partial content of the content, the first partial content being distributed from the distributing apparatus by a streaming technique and successively reproduced by said reproduction step after the saving request is generated,
   wherein, in the case where the saving request is generated during the reproduction of the content for the preview, said second storage step further comprises saving a second partial content of the content, the second partial content being distributed from the distributing apparatus by a downloading technique according to the saving request and corresponding to the pieces of content distributed from the distributing apparatus by the streaming technique and reproduced for the preview by said reproduction step before the saving request is generated, and
   wherein, in the case where the saving request is generated during the reproduction of the content for the preview, the first saving data and the second saving data are saved in the non-volatile second storage device to acquire the whole of the content.

* * * * *